March 21, 1967 R. L. WELCH 3,310,237
RECIRCULATING LIQUID FERTILIZER APPARATUS WITH
SPIRAL AGITATION BLADE
Original Filed Dec. 16, 1963
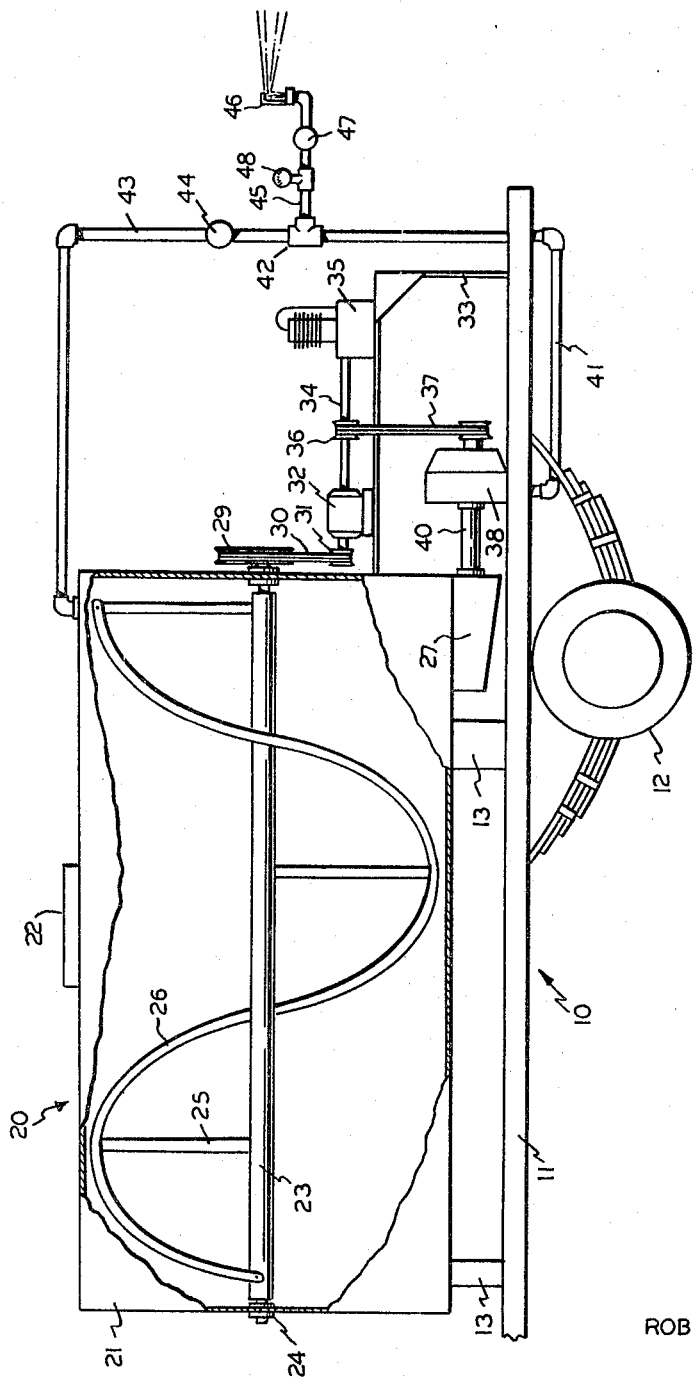
INVENTOR
ROBERT L. WELCH
BY
AGENT United States Patent Office 3,310,237
Patented Mar. 21, 1967

3,310,237
RECIRCULATING LIQUID FERTILIZER APPARATUS WITH SPIRAL AGITATION BLADE
Robert L. Welch, Decatur, Ill., assignor to W. R. Grace & Co., New York, N.Y., a corporation of Connecticut
Continuation of application Ser. No. 330,722, Dec. 16, 1963. This application May 12, 1966, Ser. No. 549,731
2 Claims. (Cl. 239—127)

This is a continuation of application Ser. No. 330,722, filed Dec. 16, 1963, and now abandoned.

The present invention relates to the application of fertilizer to croplands, and more specifically to apparatus which is capable of quickly and precisely distributing liquid slurries of finely divided fertilizer over a wide area.

Liquid fertilizer compositions are well known to those skilled in the art. Aqueous solutions of soluble fertilizer compounds such as ammonium and potassium nitrate, and urea, as well as solutions of soluble phosphate have been applied to growing areas for many years. Normally, these aqueous solutions have been applied using spray techniques. It is found that large areas may be quickly and economically covered in this manner.

To date, however, spray application has been found suitable only for the application of completely water soluble fertilizers. Fertilizers which have a relatively low solubility in water are applied as dry particulate material using mechanical spreading devices. Accurate mechanical spreading of dry particulate fertilizer is frequently hampered by lumping of the particulate material, uneven ground conditions, and mechanical limitations in the size of the spreading devices.

Attempts to spray slurries of particulate fertilizer compositions have not been attempted because it has heretofore been thought that aqueous slurries of particulate fertilizers (particularly those of the relatively slowly soluble phosphate type), are too coarse and non-uniform to be accurately applied by spray techniques. Hence, spray application of fertilizer has been restricted to those fertilizer compounds which are highly water soluble. These highly soluble fertilizer compositions are frequently expensive, and in many applications undesirable due to the ease and rapidity with which they are leached from the soil.

It has been recently found that extremely finely divided and uniform aqueous suspensions of particulate phosphate fertilizer may be prepared by at least partially acidulating phosphate rock with nitric acid in the presence of an anionic surface action agent, and subsequently neutralizing the acidulated mixture with ammonia. Given the proper spray application equipment, the resultant fertilizer slurry is sufficiently fluid and uniform to be applied to cropland by spray techniques.

It is therefore an object of the present invention to provide a spray device which is capable of applying aqueous slurries of finely divided particulate fertilizers to cropland.

It is another object to provide an apparatus for spraying slurried particulate fertilizers which are simple to manufacture, easy to operate and economical to maintain.

It is a further object to provide a slurried fertilizer spraying device which is capable of covering large areas of cropland in a closely controlled, uniform manner without clogging and stoppage.

These, and still further objects of the further invention, will become readily apparent to one skilled in the art from the following detailed description and drawing, wherein:

The accompanying figure represents a side view of one preferred embodiment of the present invention with parts cut away.

Broadly, the present fertilizer spray apparatus comprises a mobile spray unit consisting of a tank equipped with agitating means mounted on a mobile chassis, and a pump connected spray means for distributing fertilizer slurry over a desired area.

A more comprehesive understanding of the invention is obtained by referring to the accompanying figure wherein it is seen that chassis, generally 10, comprises a longitudinal rigid support 11 equipped with wheel means 12. Mounted on the longitudinal support 11, by means of upright supports 13, is slurry tank, generally 20. The slurry tank 20, comprises an elongated, cylindrical tank 21, having an opening 22 at the top thereof. Mounted inside tank 21, along the longitudinal axis thereof, is mixer shaft 23. Mixture shaft 23 is rotatably mounted within tank 21 on journal means 24. Extending radially from mixture shaft 23, are blade supports 25. Blade supports 25 support a spiral mixing blade 26, which extends substantially the length of the tank, and comes into close proximity with the walls thereof. At the rear of tank 21, that is the right-hand end as appearing in the figure, and at the bottom thereof is sump 27.

Mixer shaft 23 has affixed at one end mixed pulley 29, which is operatively connected by means of belt 30, to drive pulley 31. Drive pulley 31 is driven through gear reduction box 32, which is supported on drive gear support 33. The gear reduction box 32 is driven by shaft 34, which extends from engine 35, also supported on the drive gear support 33.

A pump drive pulley 36 is mounted on drive shaft 34 between the gear reduction box 32 and engine 35. This pump drive pulley 36, by means of pump belt 37, drives centrifugal pump 38. The suction side of pump 38 is connected to sump 27 of tank 21, by means of suction conduit 40. Attached to the pressure side of pump 38 is conduit 41, which extends to pipe T 42. Branching from pipe T 42 is by-pass conduit 43, which extends upward and over to the top of tank 21 and enters therein. Located in by-pass conduit 43 is by-pass control valve 44.

Extending from the other side of T 42 is spray conduit 45. Located at the far extreme of the spray conduit 45 is spray nozzle 46. Located in spray conduit 45, between T 42 and the spray nozzle 46, is spray control valve 47 and spray pressure gauge 48.

In operation, fertilizer slurry (not shown) is loaded into tank 21 through opening 22. Engine 35 is started and through gear box 32, mixing shaft 23 is rotated at a relatively low speed on the order of 20 to 30 revolutions per minute. The rotating action of the spiral mixer blade 26 maintains the fertilizer slurry in a constant state of agitation and uniform suspension. Furthermore, the direction of rotation of blade 26 is such that the fertilizer slurry is constantly being driven toward the rear of tank 21 into sump 27.

Fertilizer slurry in sump 27 is taken up through suction conduit 40 into centrifugal pump 38, which is also driven by engine 35. From the pressure side of pump 38, by means of conduit 41, fertilizer slurry is directed up towards T 42. From T 42 the amount of slurry actually reaching spray nozzle 46 and the amount of slurry being returned to tank 21 is controlled by means of by-pass valve 44. To adjust the desired spray pressure, which normally runs from about 10 to 100 pounds per square inch, depending on nozzle figuration, area to be covered, and amount to be delivered, a reading is directly taken from spray gauge 48. With spray control valve 47 open, and the pump 38 running at a constant speed, it is seen that opening and closing by-pass valve 44 will regulate the pressure of the fertilizer slurry which reaches nozzle 46, by regulating the amount of slurry which is permitted to bypass the spray conduit 45.

Using the above apparatus, an operator through routine experiment, may quickly determine spray pressures which are required to deliver a desired amount of fertilizer to a given area. The actual pressure used, as measured by gauge 48, will depend on the rate at which the present apparatus is moved over the ground. It is to be understood that spray control valve 47 may be remotely controlled through suitable linking means by an operator who is driving the vehicle on which the spray device is mounted.

The present spray device, depending on size, may be conveniently mounted on a truck chassis, or on a two-wheel trailer device which may be drawn by a tractor. It is also contemplated that engine 35 may be replaced by a suitable power take-off from a towing vehicle linked to the agitator drive means and pump by suitable shafting.

While the present drawing shows use of only a single spray nozzle 46, it is to be understood, that a plurality of nozzles mounted on an extended boom may be used. In one practical application, it is found that a single spray nozzle may effectively cover a path on the order of 20 to 30 feet wide. By using 2 spray nozzles, the present apparatus may be designed to cover a path upwards of 50 to 60 feet. It is seen therefore, the area of coverage obtained by the present device is substantially larger than any of the present mechanical spreaders used for distributing dry particulate fertilizer.

Fertilizer compositions which may be utilized in the present apparatus, are those prepared by first, acidulating phosphate rock with nitric acid and then carefully neutralizing the mixture with ammonia. A typical process used in preparing such a fertilizer composition is as follows:

A stainless steel reactor equipped with stirring and cooling means is charged with 925 pounds of 57% nitric acid and 0.11 pound of the sodium salt of sulfonated oleic acid. 582 pounds of phosphate rock are slowly added with constant stirring. Next 105 pounds of anhydrous ammonia is introduced into the reaction mixture at a slow rate. That is, at a rate which does not permit the exothermic reaction to exceed a temperature of 200° F. This slow addition is closely monitored until the pH of the solution reaches substantially 7, that is on the order of 6.7 to 7.2. Next 137 pounds of water is added along with 83 pounds of potassium sulfate and 284 pounds of potassium chloride. The total batch weighs 2080 pounds and comprises a stable, finely divided fertilizer slurry which contains approximately 24% water.

To illustrate how the above composition is applied using the apparatus herein contemplated, 6 tons of the fertilizer composition above defined was loaded into the apparatus shown in the accompanying figure. The operator, in a series of runs ranging from 2 miles per hour to 10 miles per hour, regulated the pressure spray feed from 10 pounds per square inch to 40 pounds per square inch. Using these combinations of speeds and spray pressures, it was quickly found that accurate fertilizer distribution ranging from about 1500 pounds per acre down to 250 pounds per acre could be readily obtained. Using one configuration of spray nozzle, it was found that a spray path ranging from 21 feet wide at 10 pounds per square inch up to 36 feet wide, at 40 pounds per square inch could be obtained.

Additional fertilizer compositions which may be readily sprayed by the present apparatus contain the ingredients set forth in the examples below. These ingredients are admixed in a manner similar to that set forth above.

*Example I*

| Ingredients: | Pounds |
|---|---|
| $HNO_3$, 57% | 500 |
| Phosphate rock, 34.4% $P_2O_5$ | 405 |
| Phosphoric acid, 55.0% $P_2O_5$ | 290 |
| KCl, 60.5% $K_2O$ | 235 |
| Anhydrous $NH_3$ | 100 |
| Water | 500 |
| Sulfonated oleic acid, Na salt | 0.11 |
| Total batch weight | 2030.11 |

*Example II*

| Ingredients: | Pounds |
|---|---|
| $HNO_3$, 57% | 500 |
| Phosphate rock, 34.4% $P_2O_5$ | 405 |
| Phosphoric acid, 55.0% $P_2O_5$ | 290 |
| KCl, 60.5% $K_2O$ | 470 |
| Anhydrous $NH_3$ | 100 |
| Water | 275 |
| Sulfonated oleic acid, Na salt | 0.11 |
| Total batch weight | 2040.11 |

The above disclosure clearly illustrates that the present apparatus may be used to quickly and accurately apply fertilizer slurries to cropland in a manner unachievable using conventional fertilizer application means.

I claim:

1. A mobile slurry fertilizer spray device comprising a mobile chassis; a horizontally disposed cylindrical slurry tank mounted on said chassis; a sump depending from the bottom of said tank at one end; said sump having an inclined closed bottom; a rotatable spiral blade mounted in said tank; said spiral blade rotating in a direction that will constantly move the slurry toward said one end of the tank having the sump and into said sump, in close proximity to the walls of said tank, and mixing the slurry; a suction conduit connected to said sump and spaced above the bottom of said sump; a centrifugal pump having a suction inlet and a pressure outlet; said suction inlet connected to said suction conduit for withdrawing slurry from said sump; a slurry spray nozzle; conduit means connecting said pressure outlet of said centrifugal pump to said slurry spray nozzle; a bypass line connected at one end to said conduit means and at its other end to said cylindrical slurry tank; an adjustable bypass valve positioned in said bypass line for continuously returning slurry pumped from said tank back to said tank at selectable rates when said mobile slurry fertilizer spray device is in operation; means for adjusting said valve to restrict the bypass flow of slurry fertilizer and provide a selected bypass rate and thereby a determinable pressure at said spray nozzle; a pressure gauge positioned in direct line between said pump and said nozzle and giving a reading corresponding to the slurry pressure going to said nozzle thereby providing the information needed to adjust the bypass valve to obtain a nozzle pressure at which the slurry will be dispensed at the proper rate; and means connecting said spray nozzle to said mobile chassis.

2. A mobile slurry fertilizer spray device comprising a mobile chassis; a horizontally disposed cylindrical slurry tank mounted on said chassis; a sump depending from the bottom of said tank at one end; said sump having an inclined closed bottom; a rotatable spiral blade mounted in said tank; said spiral blade rotating in a direction that will constantly move the slurry toward said one end of the tank having the sump and into said sump, in close proximity to the walls of said tank, and mixing the slurry; a suction conduit connected to said sump and spaced above the bottom of said sump; a centrifugal pump having a suction inlet and a pressure outlet; said suction inlet of said centrifugal pump connected to said suction conduit for withdrawing slurry from said sump; a gasoline engine independent of any mobile driving means and in driving connection with said centrifugal pump and said rotatable spiral blade and driving said pump and said rotatable spiral blade at a constant rate; a slurry spray nozzle; conduit means connecting said pressure outlet of said centrifugal pump to said nozzle; said conduit means including a T; a bypass line connected at one end to said conduit means through said T; said bypass line having its other end connected to said cylindrical slurry tank; an adjustable bypass valve positioned in said bypass line for continuously returning slurry pumped from said tank back to said tank at selectable rates when said mobile slurry fertilizer spray device is in operation; means for adjusting said valve to restrict the bypass flow of slurry fertilizer and provide the selected bypass rate and thereby a determinable pressure at said spray nozzle; a pressure gauge positioned in direct line between said T and said nozzle and giving a reading directly corresponding to the slurry pressure going to said nozzle thereby accurately providing the information needed to adjust the bypass valve with the least possible variables to obtain a nozzle pressure at which the slurry will be dispensed at the proper rate; an on-off valve positioned in said conduit between said T and said nozzle to start and stop the dispensing of the slurry fertilizer; and means connecting said spray nozzle to said mobile chassis in such a manner that the slurry will be applied to the area over which the chassis is moved.

References Cited by the Examiner

UNITED STATES PATENTS

| 599,392 | 2/1898 | Kilby et al. | 259—45 |
| 900,787 | 10/1908 | Schreck | 259—45 X |
| 2,810,606 | 10/1957 | Taylor | 239—127 X |
| 2,878,617 | 3/1959 | Finn | 239—127 X |
| 2,946,514 | 7/1960 | Johnson | 239—127 |
| 2,988,286 | 6/1961 | Snyder et al. | 239—142 X |
| 3,125,294 | 3/1964 | Lill | 239—127 X |

M. HENSON WOOD, Jr., *Primary Examiner.*

VAN C. WILKS, *Assistant Examiner.*